United States Patent [19]

Barsotti

[11] Patent Number: 5,585,172
[45] Date of Patent: Dec. 17, 1996

[54] POLYMERIC COMPOSITION FOR SOFT POLYPROPYLENE FIBERS, FIBERS OBTAINED FROM THIS COMPOSITION AND MANUFACTURED ARTICLES DERIVED FROM THESE FIBERS

[75] Inventor: Giampiero Barsotti, Terni, Italy

[73] Assignee: Moplefan S.p.A., Italy

[21] Appl. No.: 611,799

[22] Filed: Mar. 6, 1996

Related U.S. Application Data

[62] Division of Ser. No. 133,968, Oct. 8, 1993, Pat. No. 5,514,751.

[30] Foreign Application Priority Data

Oct. 9, 1992 [IT] Italy ................................ MI92A0324

[51] Int. Cl.$^6$ ................................ D01F 6/06; D01F 6/04
[52] U.S. Cl. ................................ 428/290; 428/296
[58] Field of Search ................................ 428/290, 296

[56] References Cited

U.S. PATENT DOCUMENTS

| | | |
|---|---|---|
| 3,256,367 | 6/1966 | Jayne . |
| 4,211,819 | 7/1980 | Kunimune et al. . |
| 4,521,566 | 6/1985 | Gali et al. . |
| 4,547,552 | 10/1985 | Toyota et al. . |
| 5,045,598 | 9/1991 | Duez et al. . |
| 5,212,246 | 5/1993 | Ogale . |
| 5,286,552 | 2/1994 | Lesca et al. . |
| 5,286,564 | 2/1994 | Cecchin et al. . |
| 5,298,561 | 3/1994 | Cecchin et al. . |
| 5,302,454 | 4/1994 | Cecchin et al. . |

FOREIGN PATENT DOCUMENTS

| | | |
|---|---|---|
| 0120562 | 10/1984 | European Pat. Off. . |
| 260974 | 3/1988 | European Pat. Off. . |

*Primary Examiner*—Carman J. Seccuro, Jr.
*Attorney, Agent, or Firm*—Bryan Cave LLP

[57] ABSTRACT

A polymeric composition particularly suitable for obtaining heat sealable soft polypropylene fibers comprises a propylene homopolymer modified with a propylene homopolymer having an isotacticity index higher than 80, an ethylene-propylene copolymer insoluble in xylene at 23° C. and a propylene copolymer soluble in xylene at 23° C.

4 Claims, No Drawings

POLYMERIC COMPOSITION FOR SOFT POLYPROPYLENE FIBERS, FIBERS OBTAINED FROM THIS COMPOSITION AND MANUFACTURED ARTICLES DERIVED FROM THESE FIBERS

This is a divisional of U.S. application Ser. No. 08/133, 968, filed on Oct. 8, 1993, now U.S. Pat. No. 5,514,751.

The present invention relates to a new polymeric composition. More particularly, it relates to a polymeric composition for manufacturing heat sealable polypropylene fibers, the fibers obtained from this composition, as well as the manufactured articles derived from these fibers.

Polypropylene fibers have a wide application in the manufacture of non-woven fabrics (TNT). The process for the production of these non-woven fabrics is based on the heat sealing capacity of the polypropylene fibers within a temperature range lower than the melting point of polypropylene. In the technology used at present, the heat sealable fibres go through a carding machine, in which they are partially made parallel to the machine direction and give the so called card web. The card web is subsequently treated in a calender heated at a temperature between 120° and 150° C. In the calender the fibers are subjected to a contemporaneous thermic and pressure treatment, melt partially and weld to each other, thus giving the non-woven fabric.

In order to avoid an excessive stiffness or a paper appearance of this last, the heat seal cylinder is obtained "by spots" by using of an embossed cylinder of the calender (embossed cylinder), in such a way that the surface of said cylinder useful for the weld is between 10% and 30% of the total surface of the cylinder.

The usual applications of the non-woven fabric from polypropylene fibers require a high flexibility and softness; they are in fact sanitary products, such as napkins, sanitary towels, table napkins, and bandages, which come in direct contact with the skin. Other applications also, such as the protective packing of soft and precious objects, require a high softness. Obviously, the high softness does not involve an excessive reduction of the tenacity (ultimate strength) of the non-woven fabric in the two directions at right angle between them (machine direction M.D. and cross direction C.D.) In order to satisfy the need for of a higher softness, it is possible to resort to a reduced draw of the heat sealable fiber which reduces the elastic modulus ("partially drawn" fibers); by this expedient the tenacity degree of the non-woven fabric obtained from these fibers is seriously impaired.

Patent J 2139469 describes the use of bicomponent fibers, in which the external rind is polyethylene, whereas the inside is polypropylene. With these fibers it is possible to combine a good softness and a good tenacity, but the cost of the fiber, because of the complexity of the process and of the apparatus for the manufacture, is about twice that of a normal heat sealable polypropylene fiber.

EP 260974 describes the use of bicomponent fibers wherein the polypropylene is mixed with polyethylene. EP 260974 patent describes the use of an amount between 20% and 45% by weight of low density linear polyethylene mixed with polypropylene. In the description of said patent it is stated that with amounts of polyethylene lower than 20% the tenacity does not increase and problems arise as to the dimentional stability of the fibers.

It has been found by the Applicant that a particular type of modifying polymer, notwithstanding its low concentration in the basic polypropylene, gives very good results as to softness and tenacity of the non-woven fabric obtained from the fibers.

The compositions of the fibers according to the invention comprises a homopolymer polypropylene of the type used for producing heat sealable fibers and a modifying heterophasic polymeric composition comprising:

A) from 10% to 60% by weight of a propylene polymer (homopolymer or copolymer) with isotacticity index (percentage by weight of insoluble fraction in hot n-heptane) higher than 80, B) from 3% to 25% by weight of an ethylene-propylene copolymer insoluble in xylene at 23° C., and C) from 15% to 87% by weight of a propylene copolymer soluble in xylene at 23° C., said modifying polymeric composition having a concentration lower than 20% by weight on the total.

Due to the particular composition of the fibers, the softness is remarkably higher in comparison with that of the usual heat sealable fibers from propylene homopolymer. The fibers according to the invention maintain this higher softness even after they have been transformed into non-woven fabric without undergoing particular reductions of the thoughness characteristics.

The propylene polymer (A) can be either a propylene homopolymer or a copolymer of propylene with another olefin, and it is preferably a homopolymer polypropylene or a propylene-ethylene crystal line copolymer with a content of propylene higher than 85% by w. or a crystalline terpolymer of propylene with ethylene and another alpha-olefin having from 4 to 10 carbon atoms, or mixtures thereof.

The copolymer (C) consists of propylene and another olefin, and it is preferably a propylene-ethylene copolymer with an ethylene content between 20% and 60% by weight, or a terpolymer of propylene with ethylene and a diene having an ethylene content between 20% and 60% by weight and a diene content between 0.1% and 10% by weight, or a terpolymer of propylene with ethylene and an alpha-olefin having from 4 to 10 carbon atoms, or a terpolymer of propylene with an alpha-olefin having from 4 to 10 carbon atoms and a diene, or mixtures thereof.

The propylene polymer (A) defined as above is present in the heterophasic polymeric composition in a concentration preferably between 20% and 50% by weight of the total of the modifying polymeric composition).

When propylene polymer consists of homopolymer polypropylene, the isotacticity index is preferably between 90 and 98.

The ethylene-propylene copolymer (B) has a propylene content preferably between 0.5% and 5% by weight.

The propylene copolymer (C) as above defined is present in the modifying polymeric composition in a concentration preferably between 30% and 75% by weight (of the total of the modifying polymeric composition).

Components (A), (B) and (C) of the modifying polymeric composition added to the homopolymer of propylene usually used for the preparation of heat sealable fibers are preferably prepared by sequential polymerization in two or more steps, using oatalysts of the Ziegler-Natta type. The modifying polymeric composition can also be prepared by mechanical mixing of the three components (A), (B) and (C), provided that the apparatus used for said mixing has a high homogenizing power. It is also possible to obtain by sequential polymerization—a mixture of two of the above mentioned components, and subsequently mechanically mix it with the third component.

The Melt Index value of the heterophasic polymeric composition (A)+(B)+(C) is preferably as close to that of the propylene homopolymer generally used for the production of fibers. The range of the possible change of the Melt Index is preferably between 5 and 25 g/10' (at 230° with a 2.16 kg load).

The optimum weight ratio between the propylene homopolymer generally used in spinning and the modifying polymeric composition consisting of the polymers (A), (B) and (C) is preferably between 95:5 and 80:20.

Fibers made from the polymeric composition according to the invention can be made through the same traditional spinning process used to make fibers from a propylene hompolymer. In the process for the formation of the non-woven fabric, it is not necessary change the carding step; in the calender step it is preferable to lower the temperature of 5°–10° C.

Furthermore, it has been surprisingly found that the fibers according to the present invention can be coupled with polyolefinic films with results better than those obtainable with fibers from propylene homopolymer. The manufactured articles consisting of non-woven fabric from polyolefinic fibers coupled with one or more polyolefinic films are widely applied for example as napkins, overalls, protective garments etc. The coupling between the film and the non-woven fabric is performed by means of adhesives, bonding agents or hot melts, with complications as to the process and remarkable cost burden. The heat seal between the non-woven fabric and the polyolefinic film has shown till now problems relating to poor adhesion.

It has been observed that the polypropylene fibers according to the present invention, as well as the non-woven fabrics produced from them, are very easily coupled with a polyolefinic film by simple thermic treatment in a calender at temperatures between 100° and 150° C., with a coupling pressure between 20 and 100 kg/linear cm between the two cylinders of the calender (smooth and embossed cylinder).

The best coupling results have been obtained with a polyolefinic film having a substantially identical composition as that of the heterophasic polymeric composition used as the modifier of the propylene homopolymer in the manufacture of fibres. In particular, very good results have been obtained using a soft film obtained from a heterophasic polymeric composition comprising:

A) from 10% to 60% by weight of a propylene polymer (homopolymer or copolymer) having isotacticity index (percentage by weight of the fraction insoluble in boiling n-heptane) higher than 80, B) from 3% to 25% by weight of an ethylene-propylene copolymer insoluble in xylene at 23° C., and C) from 15% to 87% by weight of a propylene copolymer soluble in xylene at 23° C.

It has been observed that the tenacity of the composite manufactured article (film+non-woven fabric) thus obtained is higher than the tenacity of a composite manufactured article obtainable from homopolymer polypropylene fibers, contrary to what would be expected when taking into account the higher tenacity of the homopolymer fibers in comparison with that of the fibers according to the present invention.

Further advantages and characteristics of the present invention will be clear from the examination of the following examples, which have not to be intended as limitative of the scope of the present invention.

EXAMPLE 1

A spinning pilot line for polypropylene has been used to produce staple fiber, in separated production oyles, starting from the following materials:

1) Homopolymer polypropylene, having Melt Index=12 g/10 minutes and isotactic index (fraction by weight insoluble in boiling n-heptane) equal to 96%—Physical form: powder ("flakes").

2) Blend of:

95% homopolymer polypropylene as the above described;

5% polymeric composition consisting of:

50% (by weight) propylene isotactic homopolymer, having isotacticity index about 96%;

10% ethylene copolymer with about 2% by weight of propylene, insoluble in xylene at room temperature;

40% of ethylene-propylene copolymer, in weight proportion 60/40, completely amorphous and soluble in xylene at room temperature.

Melt Index of the composition: 12 g/10'

3) Blend of:

90% homopolymer polypropylene as above described

10% polymeric composition consisting of:

50% (by weight) propylene-ethylene random copolymer (97.5/2.5), having isotacticity index 92;

8% ethylene/propylene copolymer (98/2), insoluble in xylene at room temperature;

42% ethylene/propylene copolymer (50/50), completely soluble in xylene at room temperature.

Melt index of the composition: 8.5 g/10'.

The spinning and finishing conditions were as follows:

Spinneret with 1881 holes

Extruder temperature: 295° C.

Head temperature: 300° C.

Collecting speed: 750 meters/min.

Spinning count: 4.1 dtex

Drawing ration: 2.4

Final titre: 2.2–2.3 dtex

Crimping: 10 waves/cm

Finish: 0.4%–0.45%

Cut: 4 cm

In three separate production cycles the following results have been obtained.

|  | Fiber 1 | Fiber 2 | Fiber 3 |
| --- | --- | --- | --- |
| Tenacity (g/dtex) | 25.4 | 27.8 | 22.0 |
| Elongation at break (%) | 315 | 189 | 310 |
| Elasticity modulus (g/dtex) | 98 | 100 | 75 |
| Sticked fibers (%) | 1 | 0 | 0 |

The three fibers have been used for preparing non-woven fabrics, by passage in the card and subsequently in the calender (pilot apparatus). One of two cylinders is smooth, the other is embossed, with an embossed drawing of small losanges. The surface occupied by the embossed drawing was about 20% of the total surface of the cylinder.

The calendering conditions were as follows:

Temperature of cylinders: 145°/145° C.

Pressure of cylinders: 50 kg/linear cm.

Formation speed of non-woven fabric: 70 m/min

Substance of the produced non-woven fabric: 20 g/m$^2$

Non-woven fabrics having the following characteristics have been obtained:

|  | Fiber 1 | Fiber 2 | Fiber 3 |
| --- | --- | --- | --- |
| M.D. Tenacity* (N/5 cm) | 58.0 | 72.5 | 39.0 |
| C.D. Tenacity* (N/5 cm) | 9.6 | 10.3 | 10.0 |
| M.D. Elongation* at break (%) | 60 | 43 | 46 |
| C.D. Elongation* at break (%) | 79 | 81 | 95 |
| Thermobonding index** | 23.6 | 27.3 | 19.7 |
| Softness*** | 3.0 | 3.5 | 4.5 |

*: Tenacity and elongation measurements have been carried out according to UNI 8639 standard
**: Thermobonding index is the square root of the product of the tenacity according to the "Machine Direction" (M.D.) for the tenacity according to the "Cross Direction" (C.D.).
***: The softness is evaluated as the mean of judgments of a test panel who used a scale of reference values from 1 (stiff) to 5 (very soft).

EXAMPLE 2

The process for the production of non-woven fabric, has been carried out by contemporaneously supplying to the two calendering cylinders the fiber web coming from the card (card web) with average substance equal to 20 g/m², and a soft polypropylene film having a 15 μm thickness. The polypropylene film had been obtained by blown-bubble technology, using a resin having the following composition;

A) 30% of ethylene/propylene copolymer, containing 1.6% of ethylene;

B) 5% of ethylene/propylene copolymer, insoluble in xylene at 23° C. and containing about 0.8% of propylene;

C) 65% of propylene/ethylene copolymer, soluble in xylene at 23° C., containing 26% of ethylene;

Melt Index of the composition: 0.8 g/10' (ASTM D 1238 condition L—230° C.—load 2.16 kg).

The plough planing of the film and card web was carried out by bringing the film in direct contact with the smooth cylinder, maintained at the temperature of 105° C. and the card web in contact with the embossed cylinder, maintained at 125° C.

The results obtained using the same film and fibers corresponding to cycles 1 and 3 of the example 1 were as follows.

|  | Film alone | Coupled film/fiber 1 | Coupled film/fiber 3 |
| --- | --- | --- | --- |
| M.D. Tenacity N/5 cm | 18 | 45 | 45.3 |
| C.D. Tenacity N/5 cm | 7 | 10 | 10.5 |
| M.D. Elongation at break, % | 240 | 83 | 77 |
| C.D. Elongation at break, % | >400 | 76 | 52 |
| Substance (g/m²) | 14 | 30 | 33 |
| Softness |  | higher for the coupled Film/Fiber 3 |  |
| Noise |  | lower for the coupled Film/Fiber 3 |  |

I claim:

1. Non-woven fabric made from heat sealable polypropylene fibers, said fibers made from a composition comprising a propylene homopolymer and a modifying heterophasic polymeric composition, said modifying heterophasic composition comprising:

(a) from 10% to 60% by weight of a propylene polymer having an isotacticity index, expressed as the percentage by weight that is insoluble in boiling n-heptane, higher than 80, (b) from 3% to 25% by weight of an ethylenepropylene copolymer having a propylene content between 0.5% and 5% by weight, said ethylene-propylene copolymer being insoluble in xylene at 23° C., and (c) from 15% to 87% by weight of a propylene copolymer, said propylene copolymer being soluble in xylene at 23° C., said modifying heterophasic polymeric composition constituting less than 20% by weight of the total weight of said polymeric composition.

2. A coupled article comprising the non-woven fabric of claim 1 coupled with a polyolefinic film.

3. A coupled article comprising the non-woven fabric of claim 1 coupled with a polyolefinic film, said polyolefinic film having a polymeric composition substantially identical to said modifying heterophasic polymeric composition.

4. A coupled article comprising the non-woven fabric of claim 1 coupled with a polyolefinic film, said polyolefinic film comprising:

(a) from 10% to 60% by weight of a propylene polymer having an isotacticity index, expressed as the percentage by weight that is insoluble in boiling n-heptane, higher than 80, (b) from 3% to 25% by weight of an ethylene propylene copolymer insoluble in xylene at 23° C., and (c) from 15% to 87% by weight of a propylene copolymer, said propylene copolymer being soluble in xylene at 23° C.

* * * * *

UNITED STATES PATENT AND TRADEMARK OFFICE
CERTIFICATE OF CORRECTION

PATENT NO. : 5,585,172

DATED : December 17, 1996

INVENTOR(S): Giampiero Barsotti

It is certified that error appears in the above-identified patent and that said Letters Patent is hereby corrected as shown below:

On Patent Cover Sheet, under Foreign Application Priority Data, delete "MI92A0324" and insert --MI92A2324--

Signed and Sealed this

Eighteenth Day of March, 1997

Attest:

BRUCE LEHMAN

*Attesting Officer*  Commissioner of Patents and Trademarks